United States Patent Office 3,560,480
Patented Feb. 2, 1971

3,560,480
PROCESS FOR MAKING ANIONIC WATER-SOLUBLE POLYSACCHARIDES
Emilio Kruger, Milan, Italy, assignor to Cartiera
Di Cairate S.p.A., Milan, Italy
No Drawing. Filed June 17, 1969, Ser. No. 834,140
Int. Cl. C08b 25/02, 29/14
U.S. Cl. 260—231                 4 Claims

ABSTRACT OF THE DISCLOSURE

A process for obtaining anionic water soluble polysaccharides by introducing acid groups into the polysaccharides chain in an anhydrous solvent is described. The derivatised polysaccharides have good film forming properties and can be used as additives in the paper industry.

The present invention relates to a process for making anionic water soluble polysaccharides.

Wood hemicelluloses are next to cellulose the most abundant chemicals on our earth, but unlike cellulose, few individual hemicelluloses have so far found an industrial use in their own right.

However at least one hemicellulose, the arabinogalactan present in the wood of western larch, is now being recovered on a commercial scale.

Numerous carboxyl groups in a polysaccharide convey special characteristics such as are found in algin and sodium pectate. Extensive hydration of the polysaccharide leads to both improved solution stability and increased solution viscosity.

Polysaccharides with numerous strong acid groups are highly viscous and stable in solution. Example is carrageenan which is esterified with sulfuric acid to half ester form. Chemical modification of polysaccharides is useful for alteration of chemical and physical properties to give the polysaccharide new applications. In general the properties of neutral polysaccharides are altered to a remarkable degree by introduction of very small amounts of ionic type.

Carboxyl groups may be introduced into a neutral polysaccharide by oxidation or by appropriate derivification with chloroacetic acid.

Sulfation is an useful mean for the introduction of strongly ionized groups.

The main object of the present invention is to provide a process for introducing into a polysaccharide molecules acid groups in a very simple and rapid manner and without degradation of the molecular chain of the polysaccharide.

The use of non aqueous solvents such as methylsulfoxide or dimethylformamide drastically reduces the time of reaction and improves the efficiency of the etherifying or esterifying reagent utilisation, because the side reactions become less important. Besides, the degradation of the molecular chain is highly reduced and the derivatized polysaccharide can be easily recovered.

These and other objects are obtained by a process comprising the addition of the etherifying or esterifying agent to a polysaccharide solution in methylsulfoxide or dimethylformamide.

At the end the reaction mixture is neutralized with alkali and the derivitized polysaccharide precipitated with alcohol or acetone. If further purification is desired the polysaccharide is dissolved in water and dialized.

The derivatized polysaccharides are cold water soluble, insoluble in organic solvents and have film forming properties.

A film obtained from carboxymethylhemicelluloses has the following characteristics: thickness 32 microns, breaking load 730 kg./cm.$^2$. A water insoluble film can be obtained by addition of polyamide resin and by drying.

The polysaccharides derivatives can be also used as additives in the paper industry.

The following examples more particularly set forth certain features of the present invention.

EXAMPLE 1

1 g. of hemicelluloses recovered from the liquor of cold soda pulping, containing 80% D-xylose, 10% uronic acid, 8% D-glucose and 2% D-galactose, and 2 ml. of 27% aqueous ammonium hydroxide were thoroughly mixed and added of 10 ml. of methyl sulfoxide containing 2 g. of monochloroacetic acid. The swollen mixture was stirred at 25° C. for one hour. The almost clear solution obtained was neutralized with the required amount of 50% aqueous sodium hydroxide solution and the reaction continued at 50° C. for an additional hour. After cooling the derivatized polysaccharide is precipitated with alcohol or acetone. Degree of substitution=0.54. In the case of wood hemicelluloses the use of ammonium hydroxide in the first step of reaction is necessary in order to carry out the carboxymethylation reaction in a homogeneous medium.

EXAMPLE 2

1 g. of wood hemicelluloses containing 90% D-xylose and 10% uronic acid, is mixed with 5 parts of dimethylformamide and added of 25% (on weight of hemicelluloses) of a white powder complex sulfur trioxide-methylsulfoxide. The mixture is stirred at 25° C. for ½ hour and neutralized with the required amount of 50% aqueous sodium hydroxide solution. Degree of substitution 0.4.

EXAMPLE 3

10 g. of corn starch is stirred with 5-10 parts of methyl sulfoxide at 60-70° C. in order to obtain a complete solubilisation in methyl sulfoxide. After cooling at 25° C., 17.5 g. of monochloroacetic acid and 5 g. of sodium methoxide were added in four steps during a total time of four hours.

At the end of the reaction the derivatized starch precipitated with acetone, is completely water soluble. Degree of substitution=0.05.

I claim:
1. Method of producing anionic water soluble polysaccharides, which comprises treating wood hemicelluloses mixed with ammonium hydroxide with a solution of monochloroacetic acid in methylsulfoxide at substantially room temperature until swelling of the reaction mixture; neutralizing said reaction mixture with alkali; heating the thus neutralized reaction mixture to about 50° C., thus forming a polysaccharide derivative; cooling the reaction mixture; and precipitating the polysaccharide derivative from the cooled reaction mixture, thus obtaining an etherified polysaccharide of good degree of substitution and without molecular degradation so that the same is capable of forming films.

2. Method according to claim 1 wherein the precipitation of the polysaccharide derivative is effected by means of a liquid selected from the group consisting of alcohol and acetone.

3. Method according to claim 2 in which said wood hemicelluloses are obtained from wood pulping spent liquors.

4. Method according to claim 2 in which the reaction mixture is neutralized with aqueous sodium hydroxide.

(References on following page)

References Cited

UNITED STATES PATENTS

| | | | |
|---|---|---|---|
| 2,697,093 | 12/1954 | Jones | 260—215 |
| 2,853,484 | 9/1958 | Lolkema et al. | 260—233.3 |
| 3,401,160 | 9/1968 | Schweigher | 260—233.5 |

DONALD E. CZAJA, Primary Examiner

R. W. GRIFFIN, Assistant Examiner

U.S. Cl. X.R.

117—166; 260—13, 209, 233.3